(12) United States Patent
Kuznicki

(10) Patent No.: US 9,764,306 B2
(45) Date of Patent: Sep. 19, 2017

(54) MODIFIED ALKALI METAL NANOTITANATES FOR HYDROGEN SULFIDE ADSORPTION

(71) Applicant: Steven M. Kuznicki, Edmonton (CA)

(72) Inventor: Steven M. Kuznicki, Edmonton (CA)

(73) Assignee: THE GOVERNORS OF THE UNIVERSITY OF ALBERTA, Edmonton (CA)

( * ) Notice: Subject to any disclaimer, the term of this patent is extended or adjusted under 35 U.S.C. 154(b) by 118 days.

(21) Appl. No.: 14/470,289

(22) Filed: Aug. 27, 2014

(65) Prior Publication Data

US 2016/0059209 A1    Mar. 3, 2016
US 2017/0136442 A9    May 18, 2017

Related U.S. Application Data

(60) Provisional application No. 61/871,030, filed on Aug. 28, 2013.

(51) Int. Cl.
| | |
|---|---|
| *B01J 20/18* | (2006.01) |
| *B01D 53/52* | (2006.01) |
| *B01D 53/02* | (2006.01) |
| *B01D 53/81* | (2006.01) |
| *C01B 39/46* | (2006.01) |
| *C01B 39/02* | (2006.01) |

(52) U.S. Cl.
CPC ............ *B01J 20/186* (2013.01); *B01D 53/02* (2013.01); *B01D 53/52* (2013.01); *B01D 53/81* (2013.01); *B01J 20/18* (2013.01); *C01B 39/026* (2013.01); *C01B 39/46* (2013.01); *B01D 2253/108* (2013.01); *B01D 2257/304* (2013.01)

(58) Field of Classification Search
CPC .................................................... B01J 20/186
See application file for complete search history.

(56) References Cited

U.S. PATENT DOCUMENTS

| | | | |
|---|---|---|---|
| 4,853,202 | A |   | 8/1989 | Kuznicki |
| 4,938,939 | A |   | 7/1990 | Kuznicki |
| 5,654,061 | A | * | 8/1997 | Visioli .................. B01J 20/183 428/34.9 |
| 8,017,825 | B2 |   | 9/2011 | Kuznicki et al. |
| 8,828,439 | B2 |   | 9/2014 | Kuznicki |

OTHER PUBLICATIONS

Novel Copper-Exchanged Titanosilicate Adsorbent for Low Temperature H2S Removal Sabereh Rezaei et al. Ind. Eng. Chem. Res, vol. 51, pp. 12430-12434, Aug. 31, 2012.*
Abbasian, J., Hill, A. H., Wangerow, J. R., Flytzani-Stephanopoulos, M., Bo, L., Patel, C., & Chang, D. (1992). Development of Novel Copper-Based Sorbents for Hot-Gas Cleanup. IGT-Final Technical Report to CRSC, IGT Project No. 40330.
Anderson, M. W., Terasaki, O., Ohsuna, T., Malley, P. J. O, Philippou, A., Mackay, S. P., Ferreira, A., Rocha, J., & Lidin, S. (1995). Microporous Titanosilicate ETS-10: A Structural Survey. Philos. Mag. B., 71, 813-841.
Ayala, R. E., & Marsh, D. W. (1991). Characterization and Long-Range Reactivity of Zinc Ferrite in High-Temperature Desulphurization Processes. Ind. Eng. Chem. Res., 1, 55-60.
Baird, T., Denny, P. J., Hoyle, R., Mcmonagle, F., Stirling, D., & Tweedy, J. (1992). Modified Zinc-Oxide Absorbents for Low-Temperature Gas Desulphurization. J. Chem. Soc., Faraday Trans., 22, 3375-3382.
Gasper-Galvin, L., Atimtay, A. T., & Gupta, R. P. (1998). Zeolite-Supported Metal Oxide Sorbents for Hot-Gas Desulphurization. Ind. Eng. Chem. Res, 10, 4157-4166.
Gervasini, A., Picciau, C., & Auroux, A. (2000). Characterization of Copper-Exchanged ZSM-5 and ETS-10 Catalysts with Low and High Degrees of Exchange. Microporous Mesoporous Mater., 35-36, 457-469.
Ko, T., Chu, H., & Chaung, L. (2005). The Sorption of Hydrogen Sulphide from Hot Syngas by Metal Oxides over Supports. Chemosphere., 4, 467-474.
Kyotani, T., Kawashima, H., Tomita, A., Palmer, A., & Furimsky, E. (1989). Removal of H2S from Hot Gas in the Presence of Cu-Containing Sorbents. Fuel., 1, 74-79.
Naderi, M., & Anderson, M. W. (1996). Phase Transformation of Microporous Titanosilicate ETS-4 into Narsarsukite. Zeolites, 17, 437-443.
Quanmin, X., & Yingshu, L. (2012). Removal of Minor Concentration of H2S on MDEA-Modified SBA-15. J. Ind. Eng. Chem., 18, 169-173.
Shekhawat, D., Spivey, J. J., & Berry D. A. (2011). Fuel Cells. In Fuel Cells: Technologies for Fuel Processing; Elsevier: Oxford, pp. 1-9.
Stirling, D. (2000). Sulphur Problem—Cleaning up Industrial Feedstocks; Royal Society of Chemistry: Cambridge, Chapter 3—Adsorption and Absorption of H2S. pp. 16-30.
Stirling, D. (2000). Sulphur Problem—Cleaning up Industrial Feedstocks; Royal Society of Chemistry: Cambridge, Chapter 5—Synthesis and Characterisation of Solid Sorbents. pp. 39-66.
Westmoreland, P. R., & Harrison, D. P. (1976). Evaluation of Candidate Solids for High-Temperature Desulphurization of Low-Btu Gases. Environ. Sci. Technol., 7, 659-661.
Xue, M., Chitrakar, R., Sakane, K., & Ooi, K. (2003). Screening of Adsorbents for Removal of H2S at Room Temperature. Green Chem., 5, 529-534.
Yang, H. Y., & Tatarchuk, B. (2010). Novel-Doped Zinc Oxide Sorbents for Low Temperature Regenerable Desulphurization Applications. AIChE J., 11, 2898-2904.

* cited by examiner

*Primary Examiner* — Douglas B Call
(74) *Attorney, Agent, or Firm* — Bennett Jones LLP

(57) ABSTRACT

A hydrogen sulphide adsorbent is formed from an alkali metal nanotitanate having a portion of the alkali metal cations exchanged with metal cations reactive with hydrogen sulphide, and heat treated. A method for producing the adsorbent includes the steps of mixing an alkali metal nanotitanate in powder form into an aqueous metal cation solution to produce a slurry, which is subsequently dehydrated to produce a powder, which is heat treated. A low temperature method for removing hydrogen sulphide from a gaseous mixture involves exposing the gaseous mixture to the aforementioned adsorbent, at a temperature less than 250° C. The adsorbent maintains a high adsorption capacity over a range of activation temperatures and humidity conditions.

15 Claims, 5 Drawing Sheets

MODIFIED ALKALI METAL NANOTITANATES FOR HYDROGEN SULFIDE ADSORPTION

FIELD OF THE INVENTION

The present invention relates to new modified alkali metal nanotitanates, methods for producing the same, and methods for using the same as a hydrogen sulphide adsorbent.

BACKGROUND OF THE INVENTION

Hydrogen sulphide ($H_2S$) is a colourless gas, typically arising from natural sources, such as hot springs, volcanic gases, and natural gas, and from anthropogenic processes such as coal gasification, wastewater treatment, and petrochemical refining.

$H_2S$ is a contaminant in fuel process streams that can damage equipment even at low concentrations. $H_2S$ at concentrations as low as 3 ppm can result in severe pipeline corrosion (Baird et al., 1992). Trace amounts of $H_2S$ in natural gas may poison nickel or alumina catalysts used in steam reforming processes. $H_2S$ negatively impacts ceramic membranes used in syngas separations. The anodic platinum catalysts of proton exchange membrane (PEM) fuel cells are susceptible to $H_2S$ at concentrations of 0.1 to 1 ppm (Shekhawat et al., 2011).

Accordingly, certain industrial applications need to "polish" gas streams so that the $H_2S$ concentration is reduced to sub-ppm levels. Conventional methods for $H_2S$ sequestration include the Claus process, adsorption in liquids (e.g., alkaloamines, ammonia solutions, and alkaline salt solutions), and adsorption by activated carbon, solid supported amines, or metal oxides (Stirling, 2000; Quanmin et al., 2012). Of the various $H_2S$ removal technologies available, only reactive metal oxides have the capability and capacity to remove significant amounts of $H_2S$ to concentrations as low as several parts per billion (ppb) for low-temperature catalytic applications, or up to tens of ppms for combustion-temperature applications.

Considerable attention has been paid to using and enhancing the performance of metal oxide adsorbents at high temperatures. Oxides of iron, zinc, molybdenum, manganese, vanadium, calcium, strontium, barium, cobalt, copper and tungsten have all been identified as possible candidates for desulphurization at high temperatures in excess of 360° C. (Westmoreland et al., 1976). Only copper oxide has the ability to effectively and efficiently remove $H_2S$ at both low and high operating temperatures.

The adsorptive performance of metal oxides may be enhanced by doping with other metals. For example, zinc ferrite may be used for the desulphurization of coal gases at 538° C. (Ayala et al., 1991). A study of oxides of copper mixed with chromium, cerium, aluminum, magnesium, manganese, titanium and iron found that $CuO-Cr_2O_3$ and $Cu-CeO_2$ were the most efficient adsorbents at 650° C. (Abbasian et al., 1992).

The adsorptive performance of metal oxides may also be enhanced by loading them onto supports such as $Al_2O_3$, $TiO_2$, $SiO_2$, and zeolites to increase their structural stability and reactive surface area. A comparison of the adsorption capacities of manganese, iron, copper, cobalt, cerium and zinc supported on $\gamma$-$Al_2O_3$ for $H_2S$ removal in syngas between 500° C. and 700° C. found that 100% utilization was achieved using copper and manganese (Ko et al., 2005). A study of copper, molybdenum and manganese supported on SP-115 zeolite for desulphurization purposes noted an increase in the mechanical strength of the adsorbents (Gasper-Galvin et al., 1998). A comparative study demonstrated that the breakthrough capacities at 600° C. of copper supported on $SiO_2$ (15 wt. % copper) and copper supported on natural zeolite (major phases consisting of mordenite and clinoptilolite) (20 wt. % copper) were almost the same as that for pure copper oxide (Kyotani et al., 1989). Although copper exchanged zeolite molecular sieves result in virtually complete metal utilization due to the atomic dispersion of the metal and the high surface area of the support, the use of molecular sieves is not practical in all circumstances, primarily due to fouling of the micropores and restricted thermal stabilities.

Relatively less attention has been paid to the use of metal oxides as $H_2S$ adsorbents at low temperatures, as is required in catalytic applications such as proton exchange membrane (PEM) fuel cells. At low temperatures, $H_2S$ can only react with the first monolayer of metal oxides (Baird et al.). The material at the center of the particle, inaccessible due to the metal sulphide layer on the surface remains unreacted, thereby reducing the utilization of the metal in the adsorbent and decreases adsorbent efficiency. A comparative study of oxides of silver, copper, zinc, cobalt, nickel, calcium, manganese, and tin exposed to 1 ppm using 10 ppm $H_2S$ in nitrogen at room temperature demonstrated that hydrous copper oxide has the highest $H_2S$ uptake capacity (Xue et al., 2003). A comparative study of $H_2S$ uptake capacity at room temperature found that among $ZnO/SiO_2$ doped with eight different transition metals, $ZnO/SiO_2$ doped with copper had the highest capacity, which was twice that of $ZnO/SiO_2$ (Yang et al., 2010). It has also been demonstrated that copper and cobalt doping agents enhance the sulphur removal capacity of zinc oxide at room temperature (Baird et al., 1992). Commercially, aggregates of ZnO are used for deep $H_2S$ polishing applications where the feed stream is near ambient temperature. Although this absorbent is sufficiently cost-effective for use in sacrificial guard beds, the material performance is poor under these conditions. An alternative absorbent is R3-11G (BASF Chemical Company), a composite copper oxide material composed of high surface area, engineered nano-scale copper oxide particles. Although this absorbent has no microporosity and greatly improved metal utilization, the technology involved in engineering the nano-scale particles adds substantial cost.

Notwithstanding advances in $H_2S$ absorbents, there remains a need in the art for an adsorbent that has high adsorption capacity over a range of temperatures, particularly at lower temperatures.

SUMMARY OF THE INVENTION

In one aspect, the present invention provides a hydrogen sulphide adsorbent comprising an ETS zeolite ion-exchanged with metal cations reactive with hydrogen sulphide. In one embodiment of the adsorbent, the ETS zeolite comprises one of ETS-2, ETS-4 or ETS-10. In one embodiment of the adsorbent, the metal cations reactive with hydrogen sulphide comprise at least one of copper, barium or zinc. In one embodiment of the adsorbent, the ETS zeolite comprises ETS-2 and the metal cation reactive with hydrogen sulphide comprises copper. In one embodiment of the adsorbent, the adsorbent has an amorphous component with a copper-to-titanium atomic ratio of about 0.20 or greater. In one embodiment, the adsorbent has a specific surface area of about 180 $m^2/g$ or greater.

In another aspect, the present invention provides a method for producing a hydrogen sulphide adsorbent, said method comprising the steps of:
(a) mixing an ETS zeolite in powder form into an aqueous metal cation solution to produce a slurry;
(b) dehydrating the slurry to produce a powder; and
(c) heat treating the powder.

In one embodiment, the ETS zeolite comprises ETS-2, ETS-4 or ETS-10. In one embodiment of the method, the metal cations reactive with hydrogen sulphide comprises one or more of copper, barium or zinc. In one embodiment, the ETS zeolite comprises ETS-2 and the metal cation reactive with hydrogen sulphide comprises copper. In one embodiment, the adsorbent has an amorphous component with a copper to titanium atomic ratio of about 0.20 or greater. In one embodiment, the adsorbent has a specific surface area of about 180 $m^2/g$ or greater. In one embodiment, the adsorbent powder is heat treated in the range of about 100° C. to about 500° C.

In another aspect, the present invention provides a method for removing hydrogen sulphide from a gaseous mixture, said method comprising the step of exposing the gaseous mixture to any of the adsorbents of the present invention, as claimed or described herein. The exposure step may take place at a temperature less than about 250° C., and further, at a temperature less than about 100° C.

BRIEF DESCRIPTION OF THE DRAWINGS

The invention will now be described by way of an exemplary embodiment with reference to the accompanying simplified, diagrammatic, not-to-scale drawings. In the drawings.

DETAILED DESCRIPTION OF PREFERRED EMBODIMENTS

Figure 1:
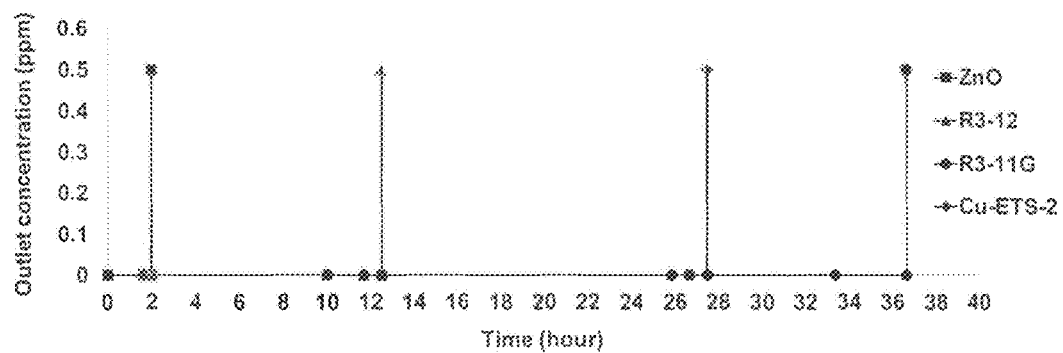
FIG. 1 is a graph showing the time to $H_2S$ breakthrough capacity of an embodiment of the Cu-ETS-2 adsorbent of the present invention, as compared to adsorbents in the prior art.

The present invention relates to a hydrogen sulphide adsorbent. When describing the present invention, all terms not defined herein have their common art-recognized meanings. To the extent that the following description is of a specific embodiment or a particular use of the invention, it is intended to be illustrative only, and not limiting of the claimed invention. The scope of the claims should not be limited by specific embodiments set forth in the description or the examples, but should be given the broadest interpretation consistent with the description as a whole. To facilitate understanding of the invention, the following definitions are provided.

"Breakthrough capacity" means the capacity of an adsorbent bed at which unadsorbed gas begins to be emitted at a concentration of 0.5 ppm.

"ETS zeolite" refers to a family of crystalline titanium silicate molecular sieve zeolites as disclosed in U.S. Pat. No. 4,853,202 and U.S. Pat. No. 4,938,939 (the entire contents of both which are incorporated herein by reference, where permitted), referred to as ETS, including family members ETS-1, ETS-2, ETS-4 and ETS-10. The thermal stability of ETS-4 and ETS-10 have been reported in the literature. An investigation into the thermal stability of ETS-4 activated at different temperatures in the air showed a partial loss of crystallinity at temperatures equal to or greater than 200° C. and complete collapse of the crystalline structure at 500° C. (Naderi et al., 1996). However, it has been shown that ETS-10 is stable at a wider temperature range up to 550° C. (Anderson et al., 1995) and that copper exchanged ETS-10 is stable up to 550° C. (Gervasini et al., 2000).

"ETS-2" refers to a titanium oxide phase essentially devoid of silica, as disclosed in U.S. Pat. No. 4,853,202 to Kuznicki, examples of which may have an x-ray diffraction (XRD) pattern having the significant lines and relative intensities as set forth in Table 1.

TABLE 1

| d-spacing (°) | I/Io |
|---|---|
| 8.75 | 85 |
| 3.70 | 40 |
| 3.16 | 100 |

ETS-2 is a high surface area sodium nano-titanate with superior ion-exchange capabilities formed by the alkaline digestion of $TiO_2$. The caustic digestion converts the surface of the $TiO_2$ particles into sodium titanate, which is an effective ion-exchanger; particularly for transition metals. The material has no measurable microporosity which makes it immune to pore blockage or capillary condensation. Having no measurable microporosity, its surface area can be as high as 250 $m^2/g$ due to the nano-scale particles. ETS-2 particles are on the order of 50-100 nanometers long. The core of these particles is presumed to be $TiO_2$ while the surface titania species carry a net negative charge which is offset by sodium ions.

"ETS-4" refers to a crystalline titanium silicate molecular sieve zeolite, as disclosed in U.S. Pat. No. 4,938,939 to Kuznicki, having a pore size of approximately 3 to 5 Angstrom units and a composition in terms of mole ratios of oxides as follows:

wherein M is at least one cation having a valence of n, y is from 1.0 to 100, and z is from 0 to 100, said zeolite being characterized by an XRD pattern having the lines and relative intensities set forth in Table 2.

TABLE 2

| d-spacing (°) | I/Io |
|---|---|
| 11.65 ± 0.25 | 30-70 to 50-100 |
| 6.95 ± 0.25 | 30-70 to 50-100 |
| 5.28 ± 0.15 | 15-50 to 30-70 |
| 4.45 ± 0.15 | 5-30 to 15-50 |
| 2.98 ± 0.05 | 50-100 |

"ETS-10" refers to a crystalline titanium silicate molecular sieve zeolite, as disclosed in U.S. Pat. No. 4,853,202, having a pore size of approximately 8 Angstrom units and a composition in terms of mole ratios of oxides as follows:

$$1.0 \pm 0.25 M_{2/n}O : TiO_2 : y\ SiO_2 : z\ H_2O$$

wherein M is at least one cation having a valence of n, y is from 2.5 to 25, and z is from 0 to 100, said zeolite being characterized by an XRD pattern having the lines and relative intensities set forth in Table 3.

TABLE 3

| d-spacing (°) | I/Io |
|---|---|
| 14.75 ± 0.35 | 5-20 to 20-40 |
| 7.20 ± 0.15 | 5-20 to 20-40 |
| 4.41 ± 0.10 | 5-20 to 20-40 |
| 3.60 ± 0.05 | 60-100 |
| 3.28 ± 0.05 | 5-20 to 20-40 |

"Alkaline metal nanotitanate" refers to a compound comprising an alkali metal and titanium oxide having a nanocrystalline structure, including ETS zeolites.

"XRD pattern" refers to an X-ray powder diffraction pattern for a substance as determined using standard crystallography techniques, and is defined by lines having d-spacings expressed as two times the Bragg angle, and relative intensity $I/I_0$ wherein I is the intensity count of the line and $I_0$ is the intensity count of the strongest line in the pattern, as read from a scintillation counter spectrometer chart.

In one aspect, the invention comprises novel alkaline metal nanotitanates which have been ion exchanged with a metal which his reactive with hydrogen sulphide, such as barium, copper or zinc. In embodiments, these materials exhibit high exchange capacity for solution cations of 7 meq/g of titanium oxide, all on crystallite exteriors with surface areas of approximately 250 to 300 m²/g. In one embodiment, the nanotitanates comprise an ETS zeolite such as ETS-2, ETS-4 or ETS-10.

In one embodiment, and without restriction to a theory, it is believed that effective forms of the metal ion-exchanged ETS zeolite are converted to an amorphous form during ion-exchange. The amorphous forms may be characterized by having metal ion-to-titanium atomic ratio of greater than 0.05, preferably greater than 0.10, and more preferably greater than about 0.20. In one embodiment, it may be about 0.21. The amorphous forms may also be characterized by having a sodium-to-titanium atomic ratio of less than about 0.12, preferably less than about 0.10, and more preferably equal to or less than about 0.05.

In one embodiment, the morphology of the ion-exchanged ETS zeolite is not significantly changed by the metal exchange process. Preferably, XRD patterns do not reflect any significant diffraction peaks for compounds of the exchanged metal cation.

The metal-exchanged ETS zeolite may be formed by suspending a slurry of the ETS zeolite in an aqueous solution of the metal salt for a sufficient period of time. In one embodiment, the weight proportion of the ETS to metal salt to water may be 1:2:10. Heat may increase the rate of reaction, allowing the metal exchange to take place more quickly. Thus, the slurry may be heated, for example to about 80° C. The ion-exchanged ETS zeolite may then be filtered and washed with de-ionized water, and dried to produce a metal ion-exchanged powder.

In another aspect, the invention may comprise a method of adsorbing hydrogen sulphide in a gas stream, using the metal ion-exchanged ETS zeolites described herein. The metal ion-exchanged ETS zeolites may be formed into particulates and used in a fixed bed, fluidized bed, or semi-fluidized bed reactors, or may be packed into a column or cartridge through which the gas stream flows.

Embodiments of the present invention are further described by way of the following examples, which are not intended to be limiting of the claimed invention.

Example 1—Preparation of Adsorbents

This example describes the preparation of three embodiments of the adsorbent using ETS-2, ETS-4 and ETS-10, respectively.

ETS-2, ETS-4 and ETS-10 were hydrothermally synthesized in accordance with the method disclosed in U.S. Pat. No. 4,853,202. In general, the method involves the following steps: preparing a reaction mixture of a titanium source, a silica source, an alkaline source, water, and optionally an alkali metal fluoride, with a certain range of mole ratios; heating the reaction mixture; allowing crystal formation; and separating, washing, and drying the crystalline ETS product. The silica source was sodium silicate (28.7% $SiO_2$, 8.9% $Na_2O$) for each of ETS-2, ETS-4 and ETS-10. The titanium source was solid titanium (iii) oxide ($Ti_2O_3$) for ETS-2, and solubilized titanium (iii) chloride $TiCl_3$ for ETS-4 and ETS-10.

Copper (II) nitrate ($Cu(NO_3)_2$) salt was added to water to create an aqueous copper nitrate solution in three separate vessels. The synthesized ETS-2, ETS-4 and ETS-10 were each added in powder form to the aqueous copper (II) nitrate solution in one of the vessels and agitated to create three slurries. In each of the slurries, the weight proportion of the ETS to salt to water was 1:2:10. The vessels containing the slurries were heated in an oven at 80° C. for approximately 18 hours. The samples were filtered and washed with de-ionized water and dried overnight at 80° C. to produce a Cu-exchanged powder. The Cu-exchanged powder was mixed with colloidal silica preparation (Sigma-Aldrich™ Ludox® HS-40, 40 wt. % suspension in water) to produce a relatively dry adsorbent mixture. The adsorbent mixture was then placed in a cylindrical mold (2.54 cm in diameter), and compressed in an axial press at a force of 6 metric tonnes for 1 minute to produce an adsorbent disk. The adsorbent disk was crushed and sieved to obtain adsorbent pellets having a standard mesh size of 20-50 mesh. The adsorbent pellets were heated in a muffle furnace, at a rate of approximately 4° C. per minute, to the desired activation temperature, and an isothermal dwell time of 2 hours.

For comparative purposes, three metal oxide samples were also obtained from BASF Chemical company: R3-11G (36 wt. % CuO); R3-12 (40 wt. % ZnO and 40 wt. % CuO); and zinc oxide (100 wt. % ZnO). The metal oxide samples were used as received and sieved to obtain pellets having a standard mesh size of 20-50 mesh.

Table 4 below summarizes the loading weights of the copper and zinc, as the case may be for the adsorbent samples.

Example 2—Comparison of Adsorbent Performance

This example describes testing of the adsorbent performance of the samples prepared as described in Example 1. The following testing procedure was followed separately with respect to each of the adsorbents.

A 50 mg sample of the pelletized adsorbent was packed between glass wool plugs in a stainless steel column having a length of 4 cm and an inside diameter of 0.38 cm to form an adsorbent bed within the column. The adsorbents were activated at a temperature of 100° C. The outlet of the column was connected to a gas chromatograph equipped with an column (Restek Corporation™ MXT®-1) having a length of 60 m and an internal diameter of 0.53 mm and a flame photometric detector (FPD) (SRI Instruments™) able to detect $H_2S$ at concentrations of 200 ppb. $N_2$ gas with 10 ppm $H_2S$ was continuously flowed through the adsorbent at a rate of 100 mL per minute, as controlled by needle valves and as measured using a bubble flow meter. It was noted that the Cu-ETS-2 pellets changed from blue-green to dark olive green with exposure to $H_2S$. The breakthrough capacity of the adsorbents was determined as the time required to first measure an $H_2S$ concentration at the outlet of the stainless steel column of 0.5 ppm using the gas chromatograph.

Atomic absorption spectrophotometry was used to analyze the copper content (wt. %) in Cu-ETS-2, Cu-ETS-4 and Cu-ETS-10. A quantity of the adsorbent was weighed using a balance with 0.1 mg resolution. Nitric acid was then added to the sample to extract the copper species and build-up 10 milliliters of solution. The copper concentration in the solution was subsequently measured with atomic absorption spectrophotometer (VARIAN 220FS). In addition, the metal ion utilization rate was determined by converting the time of the breakthrough capacity to moles of $H_2S$, and then dividing that value by the moles of copper on the adsorbent sample as measured by atomic adsorption. Table 4 below summarizes the results of the copper contents and metal utilization rates for each of the adsorbents.

TABLE 4

| adsorbent | $H_2S$ breakthrough capacity (mg $H_2S$/ g of adsorbent) | Loading (wt. %) Cu | Loading (wt. %) Zn | % metal utilization |
|---|---|---|---|---|
| Cu-ETS-2 | 47 | 12.5 | 0 | 71 |
| Cu-ETS-4 | 11 | 4.8 | 0 | 44 |
| Cu-ETS-10 | 25 | 8.4 | 0 | 98 |
| R3-11G (36 wt. % CuO) | — | 29 | 0 | 41 |
| R3-12 (40 wt. % CuO; 40 wt. % ZnO) | — | 32 | 32 | 6.5 |
| ZnO | — | 0 | 80 | 0.8 |

Without restriction to any theory, it is believed that the different copper utilization rates for Cu-ETS-4, Cu-ETS-2 and Cu-ETS-10 can be explained by their microstructure. Cu-ETS-4 and Cu-ETS-10 both have crystalline microporous frameworks. In Cu-ETS-4, the pore blockage effect may explain the relatively low copper utilization rate. That is, in crystalline materials with very small pores and channels in their structure, the copper in sites nearest to the exposed surface of the adsorbent reacts first. The copper and $H_2S$ react to form copper sulphide which partially blocks the pore openings, thereby impeding gas from accessing the rest of the crystal (Kyotani et al., 1989). In Cu-ETS-10, the larger pore diameter allows atomic dispersion of copper in the microporous framework and allows gas passage even if a channel is partially blocked, thereby allowing an almost complete copper utilization rate. Unlike Cu-ETS-4 and Cu-ETS-10, Cu-ETS-2 has a non-porous structure composed of finely divided nano-sized platelets that provide a relatively high external surface area. The substantial, but incomplete, copper utilization of Cu-ETS-2 may be due to inconsistencies in the sample structure that prevent some of the exchanged copper ions from reacting with $H_2S$, or may be the result of active copper sites being blinded by copper sulphide formation on the surface of the particles.

FIG. 1 illustrates the time to breakthrough capacity of the Cu-ETS-2 adsorbent compared to R3-11G, R3-12 and ZnO adsorbents. Cu-ETS-2 had a time to breakthrough capacity of approximately 27 hours. Among the commercial adsorbents, only R3-11G had a time to break-through capacity that surpassed that of Cu-ETS-2. However, as shown in Table 4, the copper utilization rate of R3-11G is lower than that of Cu-ETS-2. Without restriction to any theory, it is believed the copper and $H_2S$ react to form dense copper sulphide which blinds the R3-11G particles to further reaction with $H_2S$ (Kyotani et al., 1989). In contrast, it is believed that the significantly higher copper utilization rate for Cu-ETS-2 is attributable to an increase in the dispersion of copper in the ETS-2 support via ion-exchange.

Example 3—Comparison of Cu-ETS-2 and R3-11G Performance in Humidity

Figure 2:
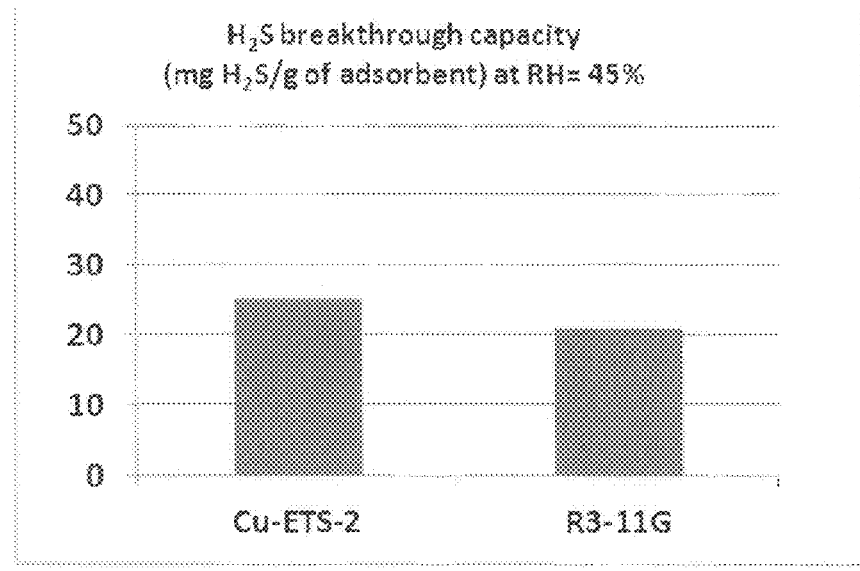
FIG. 2 is a graph showing the $H_2S$ breakthrough capacity of an embodiment of the Cu-ETS-2 adsorbent of the present invention, as compared to an adsorbent in the prior art, at a relative humidity of 45 percent.
Figure 3:
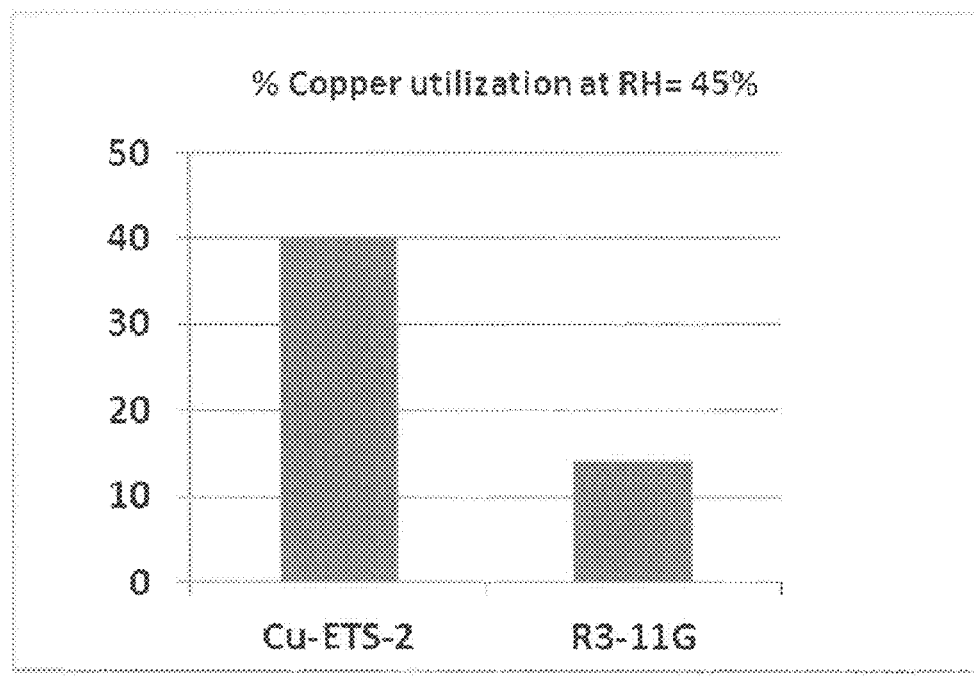
FIG. 3 is a graph showing the copper utilization rate of an embodiment of the Cu-ETS-2 adsorbent of the present invention, as compared to adsorbent in the prior art, at a relative humidity of 45 percent.

This example compares the effect of humidity on the performance of Cu-ETS-2 and R3-11G. Cu-ETS-2 and R3-11G were exposed to $H_2S$ at an inlet concentration of 10 ppm, at ambient temperature, and a relative humidity of 45 percent. FIG. 2 shows the $H_2S$ breakthrough capacity per gram of adsorbent, and FIG. 3 shows the copper utilization rate calculated on a mole/mole basis, under these conditions. The Cu-ETS-2 adsorbent exhibits a higher breakthrough capacity than R3-11G, which corresponds to an approximately four-times higher copper utilization rate than R3-11G. In view of the results in Table 4, the performance of Cu-ETS-2 in terms of copper utilization rate is relatively less sensitive to humidity, than the performance of R3-11G.

Example 4—Comparison of Cu-ETS-2 Adsorbent Performance at Different Activation Temperatures This example describes the testing of Cu-ETS-2 prepared as described in Example 1, and subjected to testing as described in Example 2 except at different activation temperatures.

Figure 4:
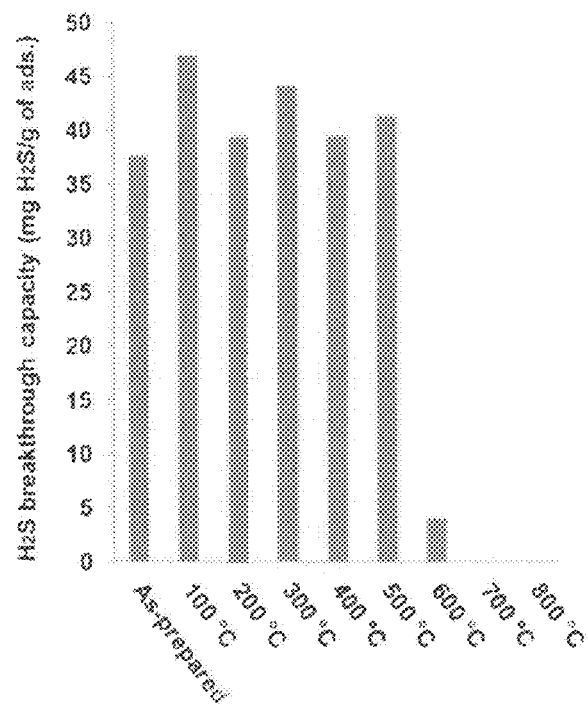
FIG. 4 is a graph showing the $H_2S$ breakthrough capacity of embodiments of the Cu-ETS-2 adsorbent of the present invention at different activation temperatures.

FIG. 4 shows the $H_2S$ breakthrough capacity per gram of Cu-ETS-2 adsorbent samples after exposure to temperatures ranging from as-prepared temperature to 600° C. The $H_2S$ breakthrough capacity of Cu-ETS-2 remains relatively unchanged even after the material has been exposed to temperatures of up to 500° C. The decrease in breakthrough capacity after exposure to temperatures exceeding 500° C. correlates with an increase in the intensity of anatase reflections seen in the XRD patterns and is attributed to a re-crystallization event which renders Cu-ETS-2 inactive toward H$_2$S, as discussed under Example 5 below.

Example 5—Morphology and Composition of Cu-ETS-2

This example describes the morphology and composition of Cu-ETS-2 prepared as described in Example 1 at different activation temperatures.

Cu-ETS-2 samples in powder form were dispersed in methanol in an ultrasonic bath for 10 minutes. One or two drops of the suspension was placed on a Carbon Type B, Au grid (300 mesh) and dried prior to analysis. The samples were then deposited in a transmission electron microscope (TEM) (JEOL Ltd. model 2010) and subjected to selected area electron diffraction (SAED) to analyze the structure of the sample, and point-specific energy dispersive X-ray spectroscopy (EDX) to analyze the elemental composition of different components of the sample.

Figure 5:
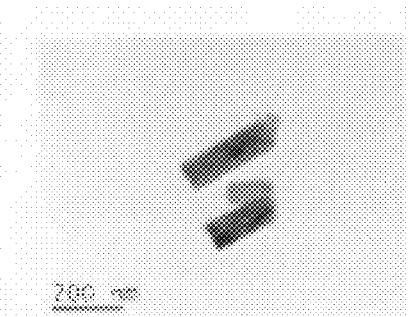
FIG. 5 is a transmission electron microscope image of the crystalline component of ETS-2 in the prior art.
Figure 6:
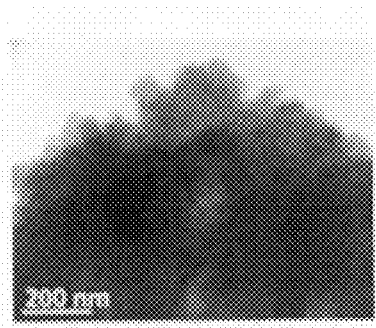
FIG. 6 is a transmission electron microscope image of the amorphous component of ETS-2 in the prior art.
Figure 7:
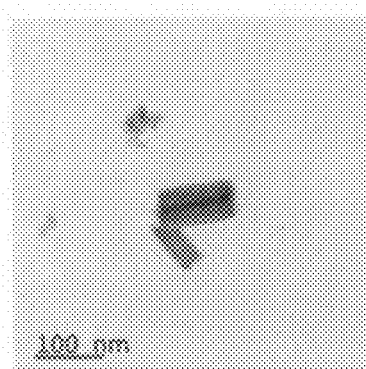
FIG. 7 is a transmission electron microscope image of the crystalline component of an embodiment of the Cu-ETS-2 adsorbent of the present invention.
Figure 8:
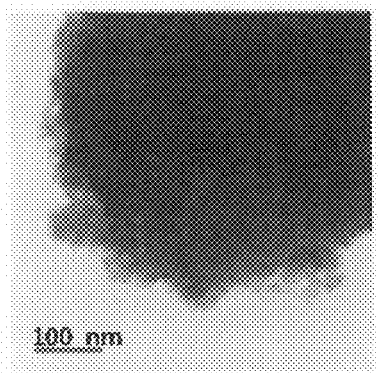
FIG. 8 is a transmission electron microscope image of the amorphous component of an embodiment of the Cu-ETS-2 adsorbent of the present invention.

The results of the TEM imaging and SAED analysis revealed the presence of a crystalline needle-like component and a non-crystalline amorphous component in the Cu-ETS-2. The structure is non-porous. FIGS. 5 and 6 depict the TEM images of the crystalline needle-like component and the non-crystalline amorphous component, respectively, of ETS-2. FIGS. 7 and 8 depict the TEM images of the crystalline needle-like component and the non-crystalline amorphous component, respectively, of Cu-ETS-2. As can be seen, the copper ion exchange process in the preparation of Cu-ETS-2 from ETS-2 does not change the morphology of ETS-2.

The EDX analysis results, as summarized in Table 5, indicate that the crystalline component of Cu-ETS-2 contained predominantly sodium ions, and a relatively low copper to titanium content. The amorphous component of Cu-ETS-2 has a relatively high copper to titanium content, which is approximately 10 times higher than that of the crystalline component of Cu-ETS-2. For this reason, it is believed that the amorphous component of Cu-ETS-2 is principally responsible for H$_2$S adsorption.

TABLE 5

| Elemental Ratio | crystalline component | amorphous component |
|---|---|---|
| Cu:Ti | 0.02 | 0.21 |
| Na:Ti | 0.15 | 0.05 |

Figure 9:
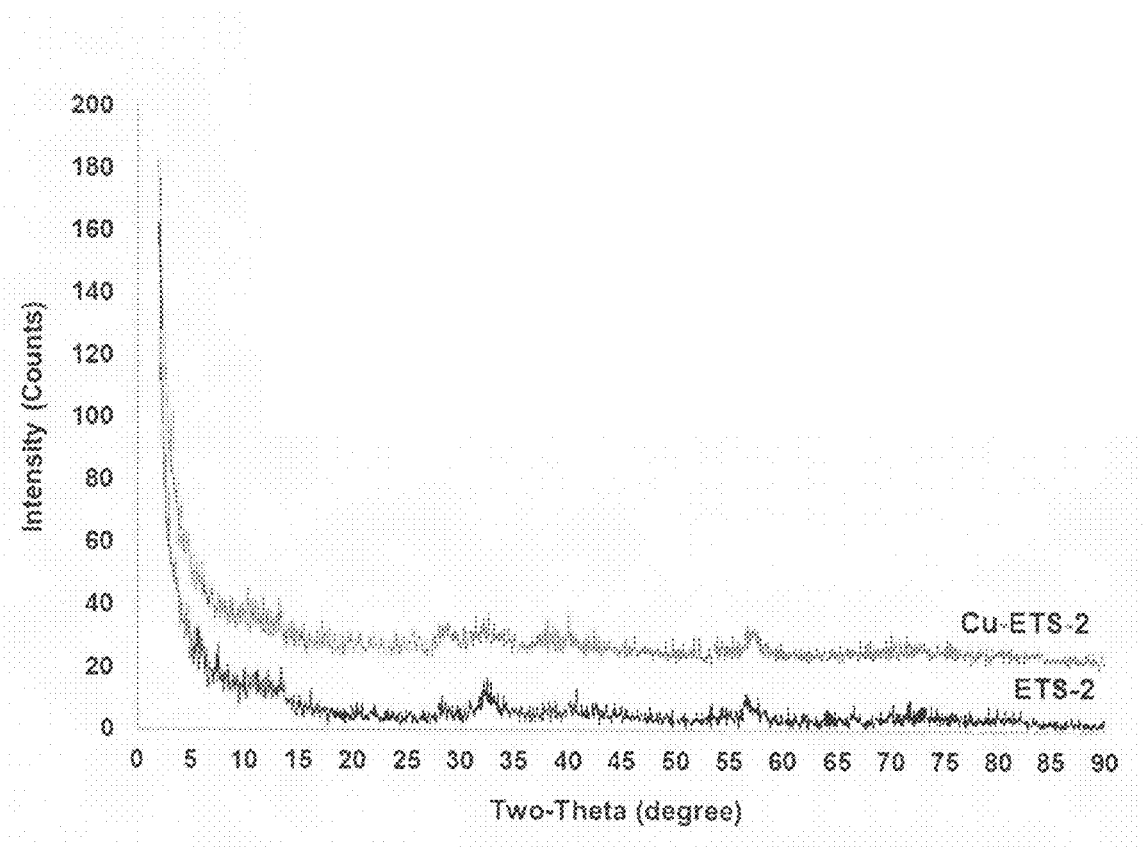
FIG. 9 is a graph showing the XRD pattern for an embodiment of the Cu-ETS-2 adsorbent of the present invention, as compared to ETS-2 in the prior art.
Figure 10:
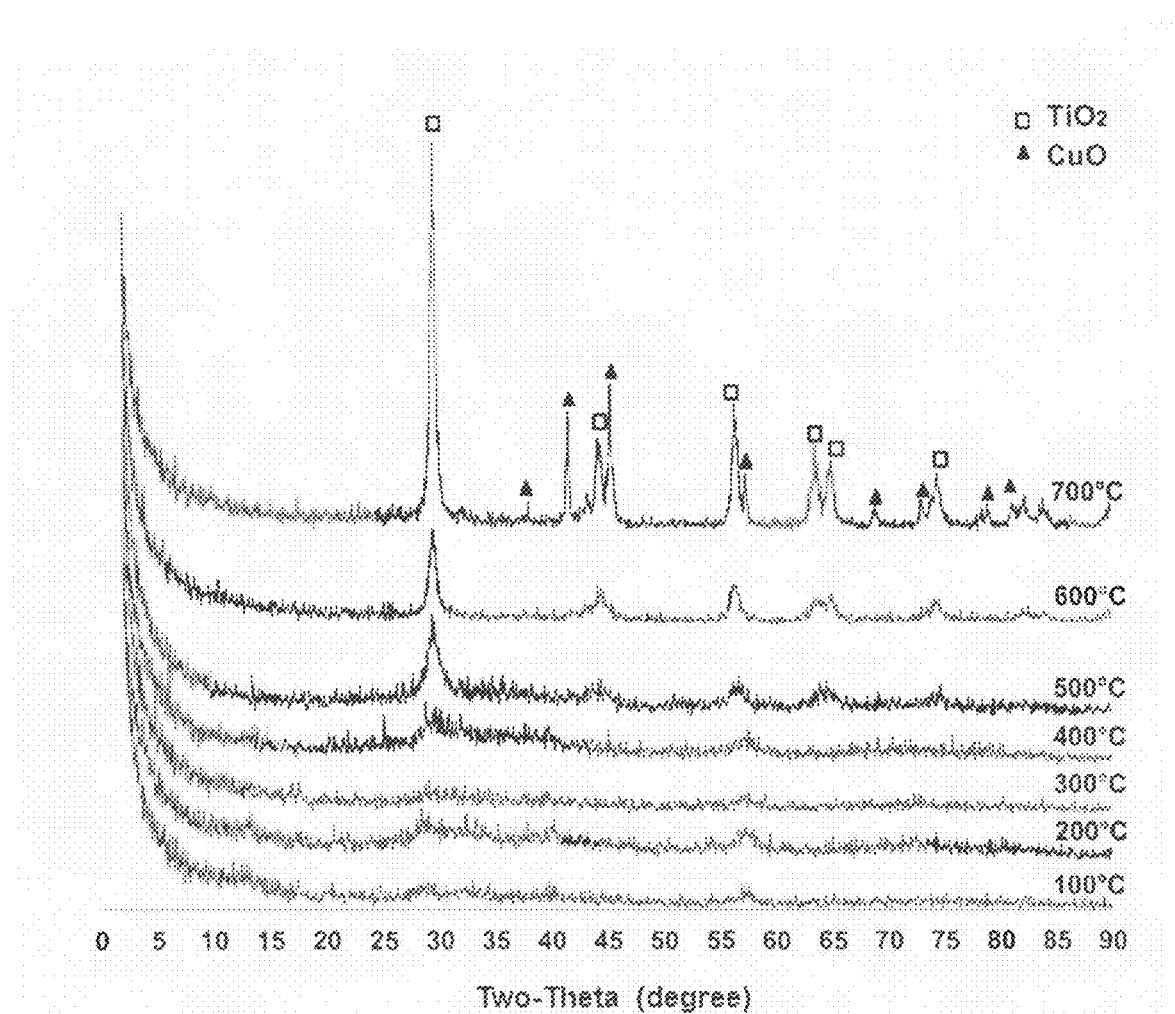
FIG. 10 is a graph showing the XRD pattern for embodiments of the Cu-ETS-2 adsorbent of the present invention activated at different temperatures.

In addition, the Cu-ETS-2 samples at different activation temperatures were subjected to XRD analysis using a diffractometer (Rigaku Geigerflex™ Model 2173) equipped with a cobalt rotating anode source (wave length of 1.79021 Å) and a graphite monochromator for filtering the K-beta wavelengths. FIG. 9 shows the XRD patterns for ETS-2 and as-prepared Cu-ETS-2. The XRD pattern for Cu-ETS-2 indicate that it has a semi-crystalline morphology, with the crystalline component detected in the TEM analysis being a minor phase relative to the amorphous component. The XRD patterns also indicate that the copper-ion exchange process in the preparation of Cu-ETS-2 does not introduce any significant changes to the ETS-2 morphology. Further, the absence of diffraction peaks for copper compounds, confirms the high atomic dispersion of copper ions in the ETS-2 structure. FIG. 10 shows the XRD patterns for Cu-ETS-2 samples exposed to different activation temperatures. The XRD pattern of Cu-ETS-2 activated at 700° C. shows reflections for anatase (TiO$_2$) and copper oxide (CuO). The emergence of these crystalline phases suggests that the amorphous components of Cu-ETS-2 change to crystalline components at higher activation temperatures.

In addition, the surface areas of ETS, as-prepared Cu-ETS-2, ETS-2 and commercial adsorbents were measured by N$_2$ adsorption using a volumetric measuring system (Quantachrome Instruments Autosorb-1™). The surface areas of the material were calculated using the BET method, which is most appropriate for ETS-2 as it is composed of platelets having an exposed surface area rather than a macroporous structure. Table 6 summarizes the specific surface areas of ETS-2 and the adsorbents.

TABLE 6

| Sample | Specific Surface Area (m$^2$/g) |
|---|---|
| ETS-2 | 230 |
| Cu-ETS-2 | 187 |
| R3-11G (36 wt. % CuO) | 152 |
| R3-12 (40 wt. % CuO; 40 wt. % ZnO) | 118 |
| ZnO | 28 |

REFERENCES

The following references are incorporated herein by reference (where permitted) as if reproduced in their entirety. All references are indicative of the level of skill of those skilled in the art to which this invention pertains.

Abbasian, J., Hill, A. H., Wangerow, J. R., Flytzani-Stephanopoulos, M., Bo, L., Patel, C., & Chang, D. (1992). Development of Novel Copper-Based Sorbents for Hot-Gas Cleanup. *IGT-Final Technical Report to CRSC, IGT Project No.* 40330.

Anderson, M. W., Terasaki, O., Ohsuna, T., Malley, P. J. O., Philippou, A., Mackay, S. P., Ferreira, A., Rocha, J., & Lidin, S. (1995). Microporous Titanosilicate ETS-10: A Structural Survey. *Philos. Mag. B.,* 71, 813.

Ayala, R. E., & Marsh, D. W. (1991). Characterization and Long-Range Reactivity of Zinc Ferrite in High-Temperature Desulphurization Processes. *Ind, Eng. Chem. Res.,* 1, 55.

Baird, T., Denny, P. J., Hoyle, R., Mcmonagle, F., Stirling, D., & Tweedy, J. (1992). Modified Zinc-Oxide Absorbents for Low-Temperature Gas Desulphurization. *J. Chem. Soc., Faraday Trans.,* 22, 3375.

Gasper-Galvin, L., Atimtay, A. T., & Gupta, R. P. (1998), Zeolite-Supported Metal Oxide Sorbents for Hot-Gas Desulphurization. *Ind. Eng. Chem. Res,* 10, 4157.

Gervasini, A., Picciau, C., & Auroux, A. (2000). Characterization of Copper-Exchanged ZSM-5 and ETS-10 Catalysts with Low and High Degrees of Exchange. *Microporous Mesoporous Mater.,* 35-36, 457.

Ko, T., Chu, H., & Chaung, L. (2005). The Sorption of Hydrogen Sulphide from Hot Syngas by Metal Oxides over Supports. *Chemosphere.,* 4, 467.

Kyotani, T., Kawashima, H., Tomita, A., Palmer, A., & Furimsky, E. (1989). Removal of H$_2$S from Hot Gas in the Presence of Cu-Containing Sorbents. *Fuel.,* 1, 74.

Naderi, M., & Anderson, M. W. (1996). Phase Transformation of Microporous Titanosilicate ETS-4 into Narsarsukite. *Zeolites,* 17, 437.

Quanmin, X., & Yingshu, L. (2012). Removal of Minor Concentration of H$_2$S on MDEA-Modified SBA-15. *J Ind. Eng. Chem.,* 18, 169.

Shekhawat, D., Spivey, J. J., & Berry D. A. (2011). *Fuel Cells. In Fuel Cells: Technologies for Fuel Processing*; Elsevier: Oxford.

Stirling, D. (2000). *Sulphur Problem—Cleaning up Industrial Feedstocks*; Royal Society of Chemistry: Cambridge.

Westmoreland, P. R., & Harrison, D. P. (1976). Evaluation of Candidate Solids for High-Temperature Desulphurization of Low-Btu Gases. *Environ. Sci. Technol.*, 7, 659.

Xue, M., Chitrakar, R., Sakane, K., & Ooi, K. (2003). Screening of Adsorbents for Removal of $H_2S$ at Room Temperature. *Green Chem.*, 5, 529.

Yang, H. Y., & Tatarchuk, B. (2010). Novel-Doped Zinc Oxide Sorbents for Low Temperature Regenerable Desulphurization Applications. *AIChE J*, 11, 2898.

What is claimed is:

1. A hydrogen sulphide adsorbent comprising an ETS-2 zeolite comprising ion-exchanged metal cations reactive with hydrogen sulphide.

2. The adsorbent of claim 1 wherein the ion-exchanged metal cations reactive with hydrogen sulphide comprises copper, barium or zinc.

3. The adsorbent of claim 1 wherein the ion-exchanged metal cation reactive with hydrogen sulphide comprises copper.

4. The adsorbent of claim 3 having an amorphous component with a copper to titanium atomic ratio of about 0.20 or greater.

5. The adsorbent of claim 3 having a specific surface area of about 180 $m^2/g$ or greater.

6. The adsorbent of claim 3 heat treated in the range of about 100° C. to about 500° C.

7. A method for producing the hydrogen sulphide adsorbent of claim 1, said method comprising the steps of (a) Mixing ETS-2 zeolite in powder form into an aqueous metal cation solution wherein the metal cations are reactive with hydrogen sulphide to produce a slurry and allowing for ion exchange by the metal cations;

(b) dehydrating the slurry to produce an ion-exchanged powder; and (c) heat treating the ion-exchange powder at less than about 500° C.

8. The method of claim 7 wherein the metal cations reactive with hydrogen sulphide comprises copper, barium or zinc.

9. The method of claim 7 wherein the metal cation reactive with hydrogen sulphide comprises copper.

10. The method of claim 9 wherein the adsorbent has an amorphous component with a copper to titanium ratio of about 0.20 or greater.

11. The method of claim 9 wherein the adsorbent has a specific surface area of about 180 $m^2/g$ or greater.

12. The method of claim 9 wherein the ETS-2 zeolite powder is mixed with colloidal silica prior to heat treatment.

13. A method for removing hydrogen sulphide from a gaseous mixture, said method comprising the step of exposing the gaseous mixture to an adsorbent comprising an ETS zeolite comprising ion-exchanged metal cations reactive with hydrogen sulphide produced by the method of claim 8 or as defined by the adsorbent of claim 1.

14. The method of claim 13 wherein the gaseous mixture is exposed to the adsorbent at a temperature less than about 250° C.

15. The method of claim 14 wherein the gaseous mixture is exposed to the adsorbent at a temperature less than about 100° C.

* * * * *